United States Patent [19]

John et al.

[11] Patent Number: 4,919,364
[45] Date of Patent: Apr. 24, 1990

[54] PROPULSION SYSTEM FOR HYPERSONIC FLIGHT

[75] Inventors: Helmut John, Munich; Otfrid Herrmann, Hohenthann, both of Fed. Rep. of Germany

[73] Assignee: Messerschmitt-Boelkow-Blohm GmbH, Munich, Fed. Rep. of Germany

[21] Appl. No.: 335,053

[22] Filed: Apr. 7, 1989

[30] Foreign Application Priority Data

Apr. 7, 1988 [DE] Fed. Rep. of Germany ....... 3811614

[51] Int. Cl.$^5$ ............................................. B64D 27/20
[52] U.S. Cl. ................................... 244/55; 244/53 B; 244/73 R; 60/225; 60/263; 60/270.1
[58] Field of Search ...................... 244/53 R, 53 B, 55, 244/73 R, 74, 62; 60/225, 263, 270.1, 244

[56] References Cited

U.S. PATENT DOCUMENTS

| | | | |
|---|---|---|---|
| 3,324,660 | 6/1967 | Lane et al. | 60/270.1 |
| 3,540,221 | 11/1970 | Bouiller et al. | 60/244 |
| 3,667,233 | 6/1972 | Corran et al. | 60/270.1 |
| 3,777,488 | 12/1973 | Gross et al. | 60/270.1 |
| 4,175,640 | 11/1979 | Birch et al. | 244/53 R |
| 4,760,695 | 8/1988 | Brown et al. | 60/270.1 |

OTHER PUBLICATIONS

Hypersonic Cruise Aircraft Propulsion Integration Study, vol. 1, by R. E. Morris et al., NASA-Contractor Report CR-158926-1, pp. 35 and 39 (FIGS. 11 and 13).

Primary Examiner—Galen Barefoot
Attorney, Agent, or Firm—W. G. Fasse; D. H. Kane, Jr.

[57] ABSTRACT

A propulsion system for an aircraft capable of hypersonic flight combines a turbo-jet with a ramjet which are so arranged that the ramjet or jets are located directly adjacent to the aircraft body while the turbo-jet or jets are located away from the aircraft body so that the ramjet or jets is placed between the turbo-jets and the body. This arrangement makes the turbo-jets much more accessible for maintenance and exchange work. Both types of engines have a common air intake which is provided with flaps capable of guiding the body boundary layer through the ramjet when the latter is not in operation. When the ramjet is in operation, the air intake flaps form the air intake in such a way that boundary layer turbulent air is mixed with undisturbed incoming air for the ramjet while the air inflow to the turbo-jet is closed off altogether. The guide channel for the body boundary layer begins upstream of the common air intake and can be closed for the ramjet operation so that the boundary layer air is guided into the air intake. At least one nozzle flap is arranged near the thrust nozzles so that both thrust jets can be influenced. One effective surface of the nozzle flap influences the ramjet while the other effective surface of the nozzle flap influences the turbo-jet.

7 Claims, 2 Drawing Sheets

PROPULSION SYSTEM FOR HYPERSONIC FLIGHT

FIELD OF THE INVENTION

The invention relates to a propulsion system for hypersonic flight by aircraft with air breathing propulsion engines. These engines are mounted to the aircraft body e.g. in underbelly fashion.

FIELD OF THE INVENTION

It is known to combine one or several turbo-engines with one or several ramjet engines, whereby the engines have a common air intake for the turbo-engine and for the ramjet engine. Each engine is provided with its own thrust or propulsion nozzle and flaps are used for controlling the air intake.

The use of two types of engines in combination is based on the recognition that aircraft, or rather flying bodies, cannot efficiently cover with one engine type only a speed range that is required to include hypersonic speeds. This range covers speeds from Mach zero to Mach ten. Such speeds can be realized in aircraft intended for operation only in the atmosphere, in an advantageous manner by the use of air breathing propulsion systems because in that case the oxidizing medium can be taken from the environment in the form of air oxygen and it is avoided to carry the oxidizing medium onboard the craft. This is important because the oxidizing medium must be counted as ballast, thus reducing the payload. The speed range from zero to approximately Mach three is the typical range for turbo-airjet engines. Such engines will be referred to in the following text as turbo-jets. Higher speeds require ramjet propulsion engines. These engines will be referred to in the following text simply as ramjets. An NASA published Report CR/158926-1, entitled "Hypersonic Cruise Aircraft Propulsion Integration Study" by R. E. Morris and G. D. Brewer discloses a propulsion plant arrangement for a hypersonic aircraft which shows in FIG. 13 on page 39 the combination of a ramjet with a turbo-jet. The ramjet is arranged below the turbo-jet. In other words, the turbo-jet is located between the aircraft body and the ramjet. Both jets have a common air intake, whereby two flaps are provided for closing the air intake portion for the turbo-jet at the air inlet side of the turbo-jet. The two propulsion or thrust nozzles of both jet engines are separated, but they discharge into the same area or zone. FIG. 11 on page 35 of the above mentioned NASA Report shows an underbelly arrangement of several propulsion engines. In the FIG. 11 disclosure of the NASA Report, the generally heavier and larger turbo-jets are also mounted close to the aircraft belly while the smaller and lighter ramjets are located away from the aircraft body below the turbo-jets.

The engine arrangement disclosed in the NASA Report have substantial disadvantages for the following reasons. It is a fact that the turbo-jets are substantially more complicated than the ramjets. Hence, the turbo-jets require substantially more maintenance attention than the ramjets. However, due to the arrangement of the ramjets below the turbo-jets, the accessibility to the turbo-jets is severely impaired, especially in a multiple engine arrangement. Further, by arranging the turbo-jet or jets directly below the aircraft body, there is a difficulty in keeping the body boundary layer which is relatively thick during turbo-operation, out of the air intake for the turbo-jet.

It is necessary to keep the turbulent body boundary layer out of the turbo air intake in order to avoid the disturbance of the very sensitive turbo-propulsion components. Where only one or two turbo-jets are used, the available space is not too problematic since the body boundary layer can be deflected conventionally by means of boundary layer deflectors, for example, in the form of boundary layer fences, boundary layer plows and the like. However, these structures cause an additional air drag. The problems become more pronounced where multi-engine arrangements are involved, because for such multi-engine arrangements, expensive, weight adding, voluminous pipe and channel systems are required for guiding the body boundary layer past the turbo-jets or engines inside the aircraft body and for discharge at the tail-end of the aircraft.

Another problem is encountered with an engine arrangement which locates the turbo-jets directly under the aircraft body due to the decreasing effectiveness of the aerodynamic control surfaces with increasing flight speeds from the supersonic range into the hypersonic range. In such underbelly engine arrangements the air entrance impulse forces and the jet exit impulse forces cause moments about the horizontal pitching axis of the aircraft. It has been found that these moments cannot be effectively compensated any more under certain circumstances by the aerodynamic control surfaces located in the free on flow of the air.

OBJECTS OF THE INVENTION

In view of the foregoing it is the aim of the invention to achieve the following objects singly or in combination:

to provide a propulsion or power plant arrangement with at least one turbo-jet and at least one ramjet which avoids the disadvantages of the prior art completely or at least substantially, even if more than two engines are combined;

to make sure that the more complex turbo-jets remain optimally accessible for maintenance work so that the required tests and maintenance procedures can be easily performed on the more sensitive turbo-jets as compared to the ramjets;

to make sure that the boundary layer airflow does not disturb the air intake or disturbs the air intake for the turbo-jet or jets as little as possible; and to effectively compensate the moments caused by entrance and exit impulse forces which have been encountered heretofore, especially in underbelly engine arrangements or to at least substantially eliminate the problems caused by these moments about the pitching axes.

SUMMARY OF THE INVENTION

The propulsion system for hypersonic flight aircraft according to the invention is characterized in that each turbo-jet is arranged with a spacing from the aircraft body so that the ramjet is or ramjets are arranged between the turbo-jet or jets and the aircraft body. A channel is provided for guiding or deflecting the body boundary layer during operation of the turbo-propulsion plant. The body boundary layer guiding or deflection channel begins upstream of the air intake which is provided in common for all types of engines. The guide or deflection channel is so arranged that it leads into the air intake for the ramjet or jets, whereby the upstream inlet or inlets of the boundary layer guide channel can be closed with one or several flaps.

By arranging the ramjets or jets between the aircraft body and the turbo-jet or jets, the invention achieves the advantage that the turbo-jet or jets are located on the outside, so to speak and therefore are always easily accessible for maintenance and repair work. Even the exchange of an entire turbo-jet unit is greatly facilitated by the arrangement of the invention. Where the underbelly arrangement is employed, the turbo-jet or jets are at least accessible from below. Additionally, the invention requires very short guide or deflection channels for the body boundary layer to guide the boundary layer into the ramjet during turbo-jet operation. This feature has several advantages because during turbo-jet operation the turbo-compressors are optimally supplied with substantially undisturbed air, and the drag increasing boundary layer deflection devices have been obviated in the air intake zone. Another advantage is seen in that the structural and weight considerations are more advantageous for short guide channels than for long guide channels that have been required heretofore. Another important advantage according to the invention is seen in the fact that flowing the boundary layer air through the ramjet or jets while these ramjets are not in operation, causes an advantageous speed distribution in the thrust nozzle zone so that the tail drag is advantageously reduced.

The nozzle flaps arranged in the boundary zone between the turbo-jets and the ramjets are tiltable flaps, thereby making it possible, within limits, to compensate for the pitching moments by diverting the propulsion jet of both types of engines, namely the turbo-jets and the ramjets. Further, when these nozzle flaps are adjusted into a respective position, they function as a flow mechanical extension of the divergent nozzle sections of the upper or of the lower propulsion plants or engines.

It is advantageous to divert not only the body boundary layer, but also the boundary layer in the air inlet so that disturbed air does not reach the air inlet of the turbo-jet. By guiding the deflected body boundary layer air and air inlet boundary air through the ramjet, improved flow conditions are produced at the tail end of the aircraft, thereby reducing the tail drag.

It is also advantageous to mix the boundary layer air with the air intake for the ramjet so as to avoid an adverse influence on the combustion process during the operation of the ramjet by non-symmetric flow conditions in the ramjet air supply.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
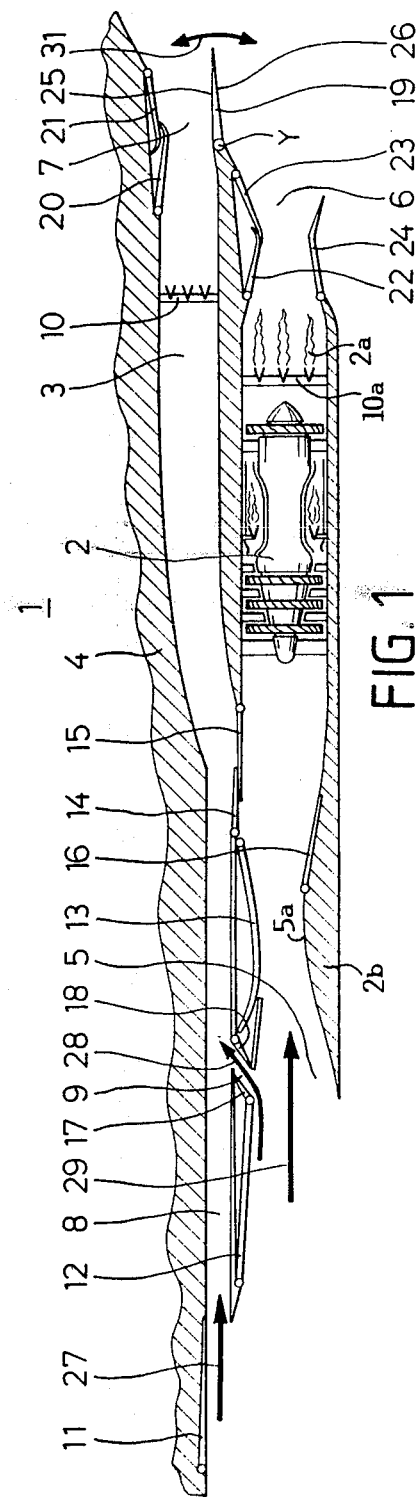
FIG. 1 is a longitudinal section through a propulsion system according to the invention shown in the condition in which the turbo-jet is operational and the ramjet is not operating.
Figure 2:
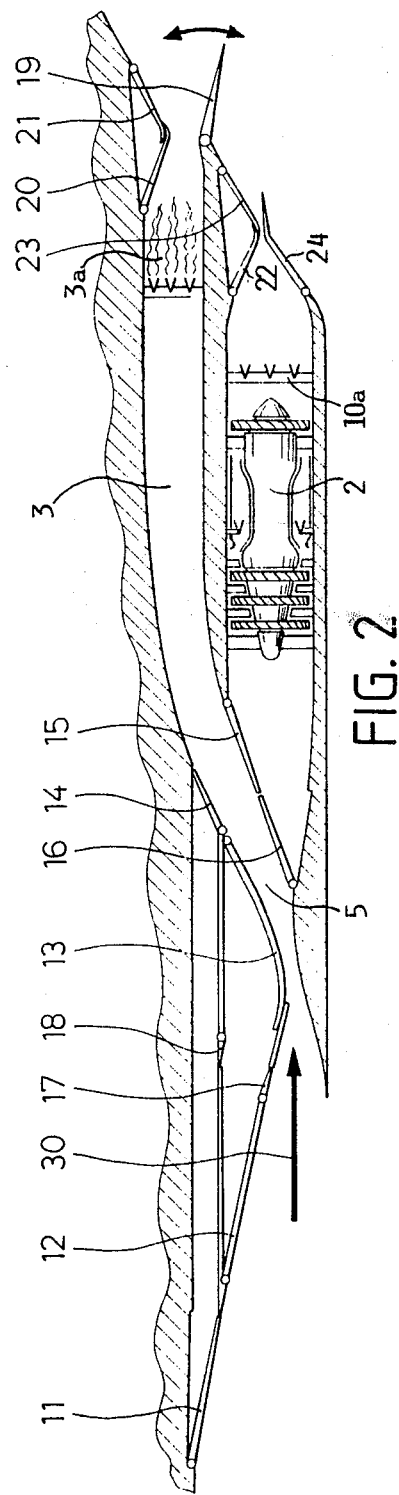
FIG. 2 is a sectional view similar to that of FIG. 1, but showing the ramjet in its operational condition while the turbo-jet is not operating.

FIGS. 1 and 2 illustrate an embodiment of the invention wherein a ramjet 3 and a turbo-jet 2 are secured to the aircraft body 1 in underbelly fashion. The ramjet 3 is arranged according to the invention directly next to the aircraft body wall 4 while the turbo-jet 2 is is arranged below the ramjet 3 to make the turbo-jet more easily accessible. Although the arrangement is shown to be of the underbelly type, the invention is equally possible when the engines are arranged to the side or above the body wall 4. In all instances the ramjet or jets 3 will be arranged between the body wall 4 and the turbo-jet or jets 2. In other words, the ramjet or jets will be located closer to the body wall 4 than the turbo-jets.

Turbo-jets are, due to their complexity and due to the high r.p.m. at which some of their components are rotating, relatively maintenance sensitive and for the same reasons these turbo-jets are subject to greater wear and tear as well as fatigue symptoms than the ramjets. Due to the invention the accessibility of the turbo-jet or jets for maintenance, testing and exchange purposes has been substantially improved. This applies particularly for the arrangement of multi-engine propulsion plants. Each air intake supplies one turbo-jet and one or several ramjets. The arrangement of several ramjets in cooperation with one turbo-jet with a common air intake is especially practical and advantageous when the ramjets have a substantially smaller cross-sectional flow area than the turbo-jet.

To simplify the illustration, FIGS. 1 and 2 assume that a common air intake 5 is provided for one turbo-jet 2 in combination with one ramjet 3.

FIG. 1 shows the situation in which only the turbo-jet 2 is operational as indicated by the exhaust flame 2a. The ramjet 3 is not operational, but constitutes a flow channel for the body boundary layer air 27. The flame 2a is shown in the combustion chamber and after burner zone of the turbo-jet 2. The arrow 29 illustrates the undisturbed air inflow into the air intake 5 which is provided in common for the turbo-jet 2 and the ramjet 3. However, in the condition in FIG. 1, the primary air intake into the ramjet 3 is closed by the flaps 14 and 15 while the flap 16 is open. The airflow 29 passes substantially as a linear flow through the turbo-jet 2 and through the thrust nozzle 6 of the turbo-jet 2. The inlet 5 is preferably constructed to have a rectangular cross-sectional flow area, whereby the back wall is not shown for simplicity's sake. The lower flow contour 5a of the air intake 5 is fixed while the upper flow contour is adjustable by the two relatively large flaps 12 and 13. FIG. 1 shows the flap position for a maximum inflow cross-sectional area, whereby the flow connection to the ramjet is closed by the flaps 14 and 15 as mentioned above. The turbulent body boundary layer 27 is passed through the guide channel 8 and through the non-operational ramjet 3 so that it exits through the thrust nozzle 7 of the ramjet 3 at the tail end of the aircraft, thereby reducing tail drag. The thrust nozzle 7 of the ramjet 3 preferably also has a rectangular cross-sectional flow area and can be adjusted by means of the nozzle flaps 20 and 21. The air exit at the end of the ram jet 3 improves the flow speed distribution in the tail area of the aircraft, whereby the air drag of the aircraft is reduced as mentioned. Thus, the body boundary layer 27 is caused to bypass the turbo-jet through the propulsion plant zone by passing the boundary layer through the ramjet for exiting at the tail end thereby aerating the tail end of the aircraft in an advantageous manner.

Depending on the length of the upper portion of the air intake 5 formed by the flaps 12 and 13, it is possible that a disturbing boundary layer is formed in this area as well. FIG. 1 shows a possibility of deflecting or peeling this air intake boundary layer, as indicated by the arrow 28, into the guide channel 8 through a connecting channel 9 so that this portion of the boundary layer air is also guided through the ramjet 3. The connecting channel 9 is formed by two flaps 17 and 18. Instead of using only one connecting channel 9, several such channels or openings may be provided between the air intake 5 and the guide channel 8. Respective flaps would be provided for opening or closing such additional connecting channels 9. However, instead of flaps, slide gates could also be used for this purpose.

The turbo-jet 2 is provided at its exit end with a thrust or propulsion nozzle 6 which first converges and then diverges. This converging and diverging shape is accomplished by the nozzle flaps 22, 23, and 24, whereby the nozzle cross-sectional flow area is variable. In the boundary zone between the thrust or propulsion nozzles 6 and 7, there is arranged a further nozzle flap 19 tiltable about a horizontal journal axis Y. The nozzle flap 19 has a first effective surface 25 which influences the jet exiting through the ramjet thrust nozzle 7. The flap 19 has a second effective surface 26 which influences the jet flow out of the nozzle 6 of the turbo-jet 2. Thus, the nozzle flap 19 can be used as a jet rudder for lengthening the divergent nozzle portion of the nozzle 6 or for closing the nozzle 7 altogether. The movability of the nozzle flap 19 is indicated by the double arrow 31. The nozzle flap 19 is conventionally driven.

FIG. 2 illustrates the operational condition in which the turbo-jet 2 is not operational while the ramjet 3 is operational as indicated by the exhaust flame 3a downstream of the fuel injection 10. The flame 2a shown in FIG. 1 downstream of the fuel injection 10a of the ramturbo-jet 3 is not shown in FIG. 2 to signify that the turbo-jet 2 is not operational. The flaps 15 and 16 close the air inlet for the turbo-jet 2 and the nozzle flaps 22, 23 and 24 close the exit nozzle of the turbo-jet 2.

The relatively simple ramjet 3 is not sensitive relative to the turbulent boundary layer air so that the body boundary layer 27 is guided by the flaps 11, 12, and 17 into the air intake 5 now leading exclusively into the ramjet 3 due to the shown positions of the flaps 13, 14, 15, and 16 so that the incoming air 30 includes undisturbed air as well as the turbulent body boundary layer and the inlet boundary layer air. The channel 8 is closed at its inlet end by the flap 11 and at its outlet end by the flap 14. The connecting channel 9 is also closed due to the shown position of the flaps 17 and 18 in FIG. 2. The flaps 12 to 16 are so positioned that together with the fixed contours of the air inlet 5, they form a flow dynamically advantageous convergent/divergent air inflow channel to the ramjet 3, whereby the channel provides a good inlet air compression efficiency.

Figure 3A:
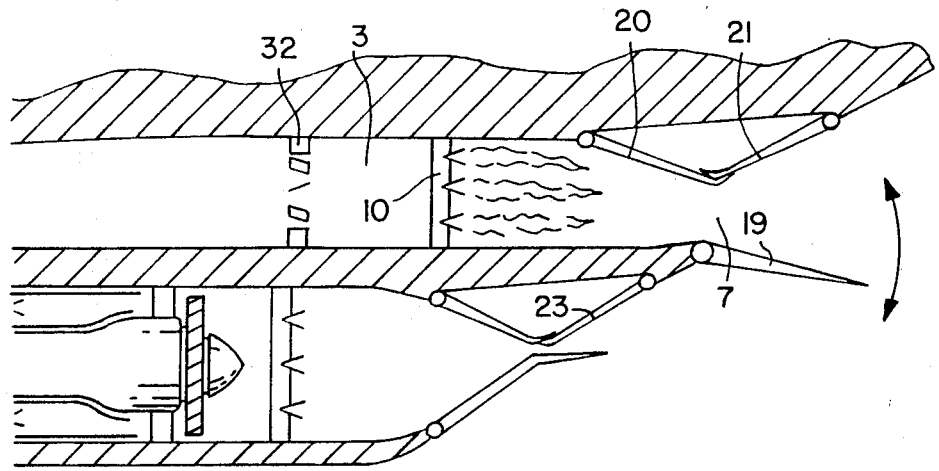
FIG. 3 is a sectional view through the ramjet showing vortex generator means inside the ramjet for mixing the boundary layer air flow with the undisturbed air from the air intake.
Figure 3B:
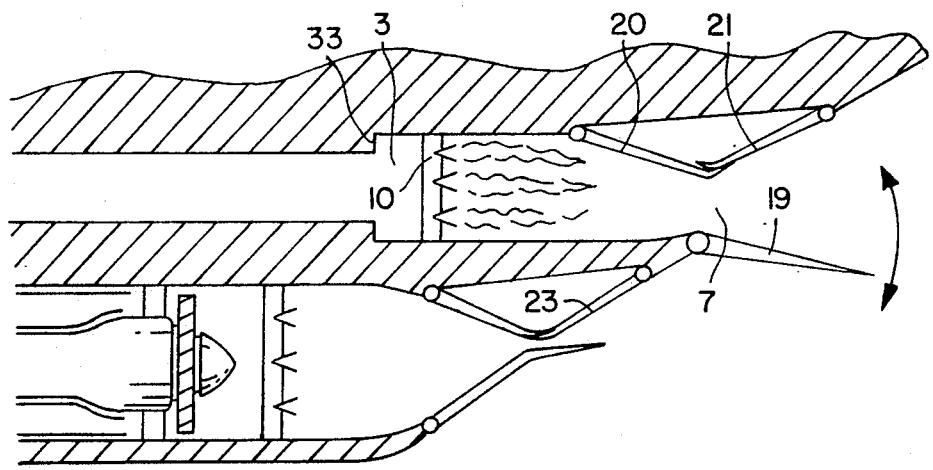

FIGS. 3A and 3B show means which provide a more uniform flow speed distribution in the combustion chamber zone upstream of the injection device 10 of the ramjet 3. Such more uniform flow speed distribution can be accomplished by means of one or several vortex generators such as boundary layer fences 32, canal stages 33, and the like, as shown in FIGS. 3A and 3B the turbulent boundary layer with the undisturbed air intake flow. The hot exhaust gases pass out through the thrust nozzle 7 the narrowest cross-sectional area of which is adjustable by the nozzle flaps 20 and 21. With the aid of the nozzle flap 19 it is possible to influence the expansion degree as well as the direction of the thrust jet out of the ramjet 3. Such a thrust vector control is more effective, especially in the hypersonic range than a control by means of conventional rudder surfaces positioned in the respective air flow.

During the transition from the turbo-propulsion of FIG. 1 to the ramjet propulsion of FIG. 2 and vice versa, that is when passing through the Mach range of 3 to 3.5 it is possible and practical to operate both types of propulsion plants simultaneously for a short time in order to avoid a thrust interruption. Although the invention has been described with reference to specific example embodiments it will be appreciated that it is intended to cover all modifications and equivalents within the scope of the appended claims.

What we claim is:

1. An air breathing propulsion system for hypersonic flight of an aircraft having a body, comprising ramjet means mounted in a location directly next to said body, turbo-jet means mounted away from said body next to said ramjet means, so that said ramjet means are located between said body and said turbo-jet means, said ramjet means and said turbo-jet means having separate thrust nozzles, common air intake means arranged for supplying air to said ramjet means and to said turbo-jet means, first flap means for controlling an air intake of said common air intake means separately for said ramjet means and for said turbo-jet means, body boundary layer guide channel means beginning upstream of said air intake means for separating a body boundary layer from an air intake for said turbo-jet means when said turbo-engine means are operating, said boundary layer guide channel means leading into said ramjet means, and second flap means arranged for opening said guide channel to lead a boundary layer through said guide channel and through said ramjet means when said ramjet means are not operating and to close said guide channel for leading a boundary layer into an air intake for said ramjet means when said ramjet means are operating while an air intake for said turbo-jet means is closed.

2. The air breathing propulsion system of claim 1, further comprising third flap means (19), journal means for mounting said third flap means in a common exhaust zone of said separate thrust nozzles, said third flap means having a first effective surface (25) for influencing an exhaust of said ramjet means and a second effective surface (26) for influencing an exhaust of said turbo-engine means.

3. The air breathing propulsion system of claim 2, wherein said journal means extend substantially horizontally.

4. The air breathing propulsion system of claim 1, further comprising a connecting channel between said air intake means and said boundary layer guide channel means, and fourth flap means (17, 18) for closing said connecting channel when said ramjet means are operating and for opening said connecting channel when turbo-jet means are operating to divert an air intake boundary layer flow into said guide channel means.

5. The air breathing propulsion system of claim 1, further comprising vortex generator means arranged in said ramjet means upstream of a combustion chamber of said ramjet means for mixing a boundary layer air with undisturbed air entering into said ramjet combustion chamber.

6. The air breathing propulsion system of claim 5, wherein said vortex generator means comprise a boundary layer fence.

7. The air breathing propulsion system of claim 5, wherein said vortex generator means comprise a channel stage.

* * * * *

UNITED STATES PATENT AND TRADEMARK OFFICE
CERTIFICATE OF CORRECTION

PATENT NO. : 4,919,364
DATED : April 24, 1990
INVENTOR(S) : Helmut John et al.

It is certified that error appears in the above-identified patent and that said Letters Patent is hereby corrected as shown below:

Column 1, line 11, replace "FIELD OF THE INVENTION" by --BACKGROUND INFORMATION--.

Signed and Sealed this

Eighteenth Day of June, 1991

Attest:

HARRY F. MANBECK, JR.

*Attesting Officer*      *Commissioner of Patents and Trademarks*